(12) United States Patent
Zanger

(10) Patent No.: US 9,429,814 B2
(45) Date of Patent: Aug. 30, 2016

(54) LASER ARRANGEMENT AND METHOD FOR ENHANCING THE LIFE SPAN OF OPTICAL ELEMENTS IN A LASER ARRANGEMENT

(71) Applicant: CryLaS Crystal Laser Systems GmbH, Berlin (DE)

(72) Inventor: Eckhard Zanger, Seddiner See (DE)

(73) Assignee: CryLas Crystal Laser Systems GmbH, Berlin (DE)

( * ) Notice: Subject to any disclaimer, the term of this patent is extended or adjusted under 35 U.S.C. 154(b) by 0 days.

(21) Appl. No.: 14/848,088

(22) Filed: Sep. 8, 2015

(65) Prior Publication Data

US 2016/0079725 A1 Mar. 17, 2016

(30) Foreign Application Priority Data

Sep. 12, 2014 (DE) .......................... 10 2014 218 353

(51) Int. Cl.
*H01S 3/108* (2006.01)
*G02F 1/39* (2006.01)
*H01S 3/08* (2006.01)

(52) U.S. Cl.
CPC ................. *G02F 1/39* (2013.01); *H01S 3/108* (2013.01); *H01S 3/08059* (2013.01)

(58) Field of Classification Search
CPC ............................ H01S 3/108; H01S 3/08059
See application file for complete search history.

(56) References Cited

U.S. PATENT DOCUMENTS

| 5,825,562 A | 10/1998 | Lai et al. |
| 6,859,335 B1 | 2/2005 | Lai et al. |
| 7,027,209 B2 | 4/2006 | Zanger et al. |
| 2002/0027932 A1* | 3/2002 | Takada ................... H01S 3/109 372/23 |
| 2002/0175149 A1 | 11/2002 | Gruber et al. |
| 2007/0258688 A1 | 11/2007 | Clubley et al. |
| 2010/0008387 A1 | 1/2010 | Furutachi et al. |

FOREIGN PATENT DOCUMENTS

| JP | 2002-151774 | * 5/2002 |
| JP | 2003057696 A | 2/2003 |

OTHER PUBLICATIONS

Ashkin et al., Resonant Optical Second Harmonic Generation and Mixing, Journal of Quantum Electronics, QE-2, Jun. 1966, pp. 109-124.

* cited by examiner

*Primary Examiner* — Dung Nguyen
(74) *Attorney, Agent, or Firm* — Klein O'Neill & Singh, LLP

(57) ABSTRACT

A laser arrangement has a first optical element, provided and established to convert a first laser beam having a first frequency into a second laser beam having a second frequency, wherein the second frequency is higher than the first frequency, and has a second optical element, which is transmitting for the first laser beam and reflecting for the second laser beam, and which is provided and established to reflect the second laser beam in a direction of reflection. Both the first optical element and the second optical element are movably mounted in such a way that they can be moved relative to a direction of light propagation of the second laser beam.

15 Claims, 2 Drawing Sheets

LASER ARRANGEMENT AND METHOD FOR ENHANCING THE LIFE SPAN OF OPTICAL ELEMENTS IN A LASER ARRANGEMENT

CROSS REFERENCE TO RELATED APPLICATION

This application claims priority to German Patent Application No. 10 2014 218 353.7 filed on Sep. 12, 2014, the entirety of which is incorporated by reference herein.

BACKGROUND

The present invention relates to a laser arrangement and to a method for enhancing the life span of optical elements in a laser arrangement.

The invention is particularly suited for laser arrangements in the form of optical frequency converters.

Optical frequency converters are employed in order to convert the frequency of a laser radiation in spectral ranges in which generating a laser radiation directly is not possible. Laser light in the deep UV range (wavelength below about 300 nm, particularly below about 290 nm, particularly below about 280 nm, particularly below about 270 nm, and particularly up to approximately 120 nm, particularly up to approximately 110 nm, particularly up to approximately 100 nm) is employed in the semiconductor industry for wafer inspection systems, among others.

Various laser arrangements are known from prior art which can generate laser light in the deep UV range by means of frequency conversion with the help of non-linear crystals. The resonant frequency conversion in a passive optical resonator has proven to be the most efficient method for frequency conversion of continuous (CW-) laser radiation (Ashkin et al. "Resonant Optical Second Harmonic Generation and Mixing", Journal of Quantum Electronics, QE-2, 1966, page 109). Therein, the laser beam to be converted is coupled into an optical resonator which contains a non-linear crystal suited for frequency conversion as well as resonator minors. The resonator is set to resonance with the radiated laser frequency by a corresponding setting of the optical resonator length. The thereby attained resonance magnification of the laser radiation circulating in the resonator allows for a high conversion efficiency into the laser radiation with the desired converted frequency. Magnification factors of up to approximately 100 and conversion efficiencies of 20% up to more than 80% are attained here, depending on the wavelength and capacity of the radiated laser light.

When generating laser light in the deep UV range, the optical elements involved, such as, for instance, the non-linear crystal or the resonator minors, are exposed to high strains due to the aggressiveness of the UV light, which leads to a degradation on the surfaces as well as inside of the material of the optical elements. Consequently, the life span of UV lasers mostly does not meet the high demands of industrial applications, which, particularly in the semiconductor industry, are generally at least 20 000 hours in continuous operation.

The degradation of the optical elements progresses the faster the higher the intensity of the UV light that acts on them. The strain on the non-linear crystal is generally the highest, because in the interest of a high conversion efficiency the beam cross section is smallest there. As the conversion efficiency in the non-linear crystal increases with the power density of the radiated laser light, in the interest of a long life span the beam cross section cannot be chosen arbitrarily large. For this would lead to a reduced power density and, hence, to an unattractive conversion efficiency. Consequently, choosing the beam cross section is always a compromise between a long life span on the one hand and a high conversion efficiency on the other hand.

A method for extending the life span without the undesirable reduction of the conversion efficiency is specified in U.S. Pat. No. 5,825,562. Therein, an optical element exposed to the UV radiation is permanently moved with the help of a mechanical device, whereas the UV beam keeps its position, so that on average the strain is distributed onto a larger portion of the optics material and the degradation is thereby slowed down.

In U.S. Pat. No. 6,859,335 the optical element is not moved permanently, but instead step by step in quick succession, wherein the step sequence shall be shorter than the typical degradation time of the material (namely in the range of milliseconds to minutes) and the same material points are used over and over again.

In both these methods known from prior art, optical elements of the laser are moved during the running operation.

Applying these methods for extending the life span to CW-laser devices with frequency conversion in the deep UV range proves to be problematic in various regards.

For instance, the motor-driven, continuous movement of an optical element within a passive resonator can lead to vibrations and thus to periodic intensity fluctuations. As the demands on the intensity noise of CW-laser devices generally are very high, this can lead to unacceptable high noise values or to a disproportionally high expenditure to prevent these vibrations, respectively.

Even the gradual movement of optical elements in quick succession can cause unacceptable disturbances of the temporal intensity process, when the succession of the disturbances takes place in shorter time spans than the process time needed during the application. Thus it is, for instance, unacceptable when within the process time needed for inspecting a wafer short intensity slumps of the UV radiation occur. The gradual movement of optical elements within a passive resonator, however, can easily provoke such intensity slumps.

Furthermore, the life span of a CW-laser device having a passive resonator for the frequency conversion is not only determined by a single optical element. In a passive resonator according to prior art, as it is shown in FIG. 4, a converted laser beam 2 generated from a first laser beam 1 exits a non-linear crystal 3 and then runs through an output coupling mirror 4, which has a high transmission for the wavelength of the converted laser beam whereas it is highly reflecting for the wavelength of the first unconverted laser beam 1.

When the non-linear crystal 3 is moved to a new position 3' with the help of suitable mechanics, the life span of the non-linear crystal is indeed enhanced, not, however, the life span of the output coupling mirror 4. Said output coupling mirror 4 is under a similar strain as the non-linear crystal 3, because the beam diameter and, consequently, the power density of the UV radiation are not substantially different from the power density at the location of the crystal 3. The life span of the entire system can therefore not be enhanced substantially by exclusively shifting the non-linear crystal, as the life span of the output coupling mirror generally is only approximately by a factor of 2 longer than the life span of a point in the crystal 3 that is subjected to UV radiation. However, the output coupling mirror 4 must not be moved along with the shifting mechanics because otherwise the passive resonator would come out of adjustment and the conversion efficiency of the arrangement would thereby immediately break down.

SUMMARY

It is an object of the present invention to make a laser arrangement available which has a longer life span than laser arrangements from prior art. Furthermore, a method for enhancing the life span of optical elements in a laser arrangement shall be made available.

This object is achieved with a laser arrangement with the features as described herein. Such a laser arrangement has a first optical element, provided and established to convert a first laser beam having a first frequency into a second laser beam having a second frequency. The second frequency here is higher than the first frequency. In other words, the laser light of the second laser beam is more energy intensive than the laser light of the first laser beam. Consequently, it has a smaller wavelength than the laser light of the first laser beam. Preferably, the light of the second laser beam has a wavelength lying in the deep UV range.

Furthermore, the laser arrangement has a second optical element which is transmitting for the first laser beam and reflecting for the second laser beam. "Transmitting" as defined by the present invention is here understood to be a transmittance of more than 50%, particularly more than 60%, particularly more than 70%, particularly more than 80%, particularly more than 90%, particularly more than 95%, particularly more than 97%, particularly more than 98%, particularly more than 99% and very particularly more than 99.5%. "Reflecting" is understood to be an optical element which reflects more than 50%, particularly more than 60%, particularly more than 70%, particularly more than 80%, particularly more than 90%, particularly more than 95%, particularly more than 97%, particularly more than 98%, particularly more than 99% and very particularly more than 99.5% of the radiated laser light. The second optical element here reflects the second laser beam in a direction of reflection. Preferably, the direction of reflection differs from a direction of light propagation of the first laser beam in the area of the second optical element.

According to the invention, the laser arrangement is characterized in that both the first optical element and the second optical element are movably mounted in such a way that they can be moved relative to a direction of light propagation of the second laser beam. That is to say, a possible movement of the first optical element and of the second optical element does not take place exclusively along the direction of light propagation of the second laser beam, but instead always perpendicular to or at an angle to it. The direction of movement of the first optical element and of the second optical element can here also comprise portions that run in the direction of light propagation of the second laser beam.

Due to the movability of the first optical element and of the second optical element it is possible to irradiate different positions or points on the first optical element and on the second optical element with the second laser radiation. Thereby, the life span of the first optical element and of the second optical element is enhanced considerably, because not only a single point is irradiated with the second laser radiation.

In the solutions known from prior art merely a single movable optical element is provided. That is to say, a mirror such as, for instance, a resonator mirror, which is used to couple out the second laser radiation, is furthermore subjected to the second laser radiation in the solutions known from prior art (cf. FIGS. 4). In contrast to this, in the solution proposed according to the invention, a second movable optical element is provided, which is employed for coupling out the second laser radiation. Thereby, resonator mirrors, when the laser arrangement is employed in a laser resonator, are not subjected to the second laser radiation, so that the life span of the resonator mirrors is enhanced accordingly. Here, the solution proposed according to the invention has the advantage that a movement of the second optical element does not cause the entire laser arrangement to come out of adjustment, because this second optical element preferably is precisely not designed as resonator mirror, but instead as an additional optical element.

Such a laser arrangement, particularly when employed in frequency-converting laser devices having an emission wavelength in the UV range, can enhance the life span considerably, that is, at least by a factor of 10, without important parameters such as intensity noise, beam position stability and direction stability of the laser deteriorating.

In a variant the first laser beam is a laser beam originating from a continuously emitting laser (CW-laser).

Preferably, the first optical element is a non-linear crystal having a crystal material. Suitable are, among others, the crystal materials beta barium borate (BBO), potassium dihydrogen phosphate (KDP), potassium dideuterium phosphate (KD*P), ammonium dihydrogen phosphate (ADP) and cesium lithium borate (CLBO). Preferably, the non-linear crystal is entirely made of this crystal material.

In a variant the first optical element has an entry plane for the first laser beam and an exit plane for the first and the second laser beam. The entry plane and the exit plane are here particularly arranged plane-parallel to each other.

In a variant the second optical element is a half-transmitting (dichroic) mirror. This dichroic mirror has an entry plane for the first laser beam and the second laser beam as well as an exit plane for the first laser beam. In particular, the entry plane and the exit plane are arranged plane-parallel to each other. As the dichroic mirror is transparent for the first laser beam and reflecting for the second laser beam, the second laser beam does not enter the mirror, but is reflected in the entry plane in the direction of reflection instead.

In a variant the laser arrangement has at least one movement appliance, which allows for a movement of the first optical element and/or of the second optical element. The movement appliance here can be controlled particularly by means of a control appliance such as, for instance, a microprocessor, so that the movements of the movement appliance can be defined precisely. The movement appliance can, for instance, be designed as a movable sledge, which can be driven by means of a corresponding motor.

In a variant the first optical element and the second optical element are arranged on a joint movement appliance. This joint movement appliance allows for a joint movement of the first optical element and of the second optical element. Due to such a joint movement the degrees of freedom are indeed restricted. For when a separate movement appliance for the first optical element and a separate movement appliance for the second optical element are provided, the two optical elements can be moved independently of one another. However, when one can do without one of the movement appliances and a joint movement appliance is used, the total number of movable parts is reduced. On the one hand, this reduces the manufacturing expenditure of the laser arrangement and, on the other hand, it allows for a preferably compact and space-saving construction of the laser arrangement.

In a variant the first optical element and the second optical element can be moved by a translation movement. The movement is particularly a linear movement, and that is preferably an exclusively linear movement. Such a movement, which can also be referred to as a shift, can be realized in an especially simple manner in that a linearly movable sledge is employed as movement appliance. In contrast to a rotation movement a linear movement has the advantage of a considerably simpler mechanical implementation, a higher precision and a lesser vulnerability to malfunction.

In a variant the first optical element and the second optical element can be moved in two spatial directions that are perpendicular to each other. One of these spatial directions can, for instance, be a direction in the x-y plane, particularly at an angle to the direction of light propagation of the second laser beam. The other spatial direction can, for instance, be a direction in the y-z plane. Thereby, both a vertical and also an in-depth movement of the first optical element and of the second optical element can be attained.

In a variant the second optical element can be moved along an entry plane for the first laser beam and/or for the second laser beam. With such a shift taking place parallel to the entry plane of the second optical element, it can be ensured that the second laser beam, reflected by the second optical element, does not wander, but is always reflected out of the laser arrangement at the same position instead.

In a variant a shift or movement of the first optical element takes place parallel to the movement or shift of the second optical element. That is to say, the first optical element is also moved along the entry plane of the second optical element for the first laser beam and/or the second laser beam. When the first optical element and the second optical element are arranged parallel to each other, a shift of the first optical element parallel to the second optical element, as it were, corresponds to a shift of the optical element along its entry plane for the first laser beam. However, when the first optical element is not arranged parallel to the second optical element, a shift along the entry plane of the second optical element for the first laser beam and/or the second laser beam does not correspond to a shift of the first optical element along its entry plane for the first laser beam.

In a variant the first optical element is arranged in such a way that the first laser beam strikes the first optical element at an incident angle which corresponds to the Brewster angle. Due to this, it is not necessary to provide special coatings on the entry planes of the first optical element in order to reduce Fresnel reflections on the first optical element.

In a variant the second optical element is arranged in such a way that the first laser beam and/or the second laser beam strike the second optical element at an incident angle which corresponds to the Brewster angle. It is particularly provided to arrange both the first optical element and the second optical element in such a way that the laser beam strikes the optical elements at the respective Brewster angle. When the Brewster angles for the first optical element and for the second optical element are identical, both optical elements can in an especially advantageous manner be shifted parallel with each other. However, even when the Brewster angles are different, this merely leads to a minor movement of the first optical element in the direction of light propagation of the first laser beam, when the first optical element is moved parallel to the entry plane of the second optical element for the first laser beam and/or the second laser beam.

In a further variant the first optical element and the second optical element are arranged within an optical system which has at least one immovable third optical element. For example, the optical system can be a laser resonator, wherein both active and passive laser resonators are conceivable. In such an arrangement of the laser arrangement within an optical system, particularly within a laser resonator, the advantages of the laser arrangement according to the invention come to bear especially well. For then it is possible, in an especially simple manner, to protect the immovable optical elements of the optical system from UV radiation, in that the laser arrangement according to the invention reflects the second laser beam, which particularly has a wavelength in the deep UV range, out of the laser arrangement and out of the optical system. For this purpose, it is particularly provided that the second optical element is arranged directly after the first optical element in the direction of light propagation of the second laser beam, without there being another optical element of the optical system between the first optical element and the second optical element. In particular, the second optical element is arranged in front of the immovable third optical element in the direction of light propagation of the second laser beam.

In a variant the optical system is a laser resonator and the third optical element is a resonator mirror. On account of the previously specified arrangement of the laser arrangement within the laser resonator, the resonator mirrors of the laser resonator can be protected from the second laser radiation in an especially simple manner.

It is therefore particularly provided that the second optical element is arranged in such a way that it reflects the second laser beam out of the laser resonator such that the second laser beam does not strike any resonator mirror. As explained, in this manner the life span of the resonator mirrors is enhanced considerably.

The object underlying the invention is also achieved by a method for enhancing the life span of optical elements in a laser arrangement with the subsequently illustrated steps.

First, a laser beam having a first frequency is channeled onto a first optical element. Thereafter, the first laser beam is converted by means of the first optical element into a second laser beam having a second frequency. The second frequency here is higher than the first frequency. That is to say, the second laser beam has a lower wavelength and a higher energy than the first laser beam.

Subsequently, the second laser beam is channeled onto a second optical element, which is transmitting for the first laser beam and reflecting for the second laser beam. In this manner, the second laser beam is reflected by means of the second optical element along a direction of reflection. After a first time duration, orientating itself by the life span of a radiated position of the first optical element and/or of the second optical element, the first optical element and the second optical element are moved relative to a direction of light propagation of the second laser beam. Due to this, "fresh" areas (positions, points) of the first optical element and of the second optical element can be irradiated by the first laser radiation and/or the second laser radiation, which enhances the overall life span of the laser arrangement.

Here, it is particularly provided that the first optical element and the second optical element are not moved continuously. Rather, a discontinuous movement of the optical elements shall take place. For a continuous movement of the optical elements causes periodic intensity fluctuations.

In a variant a break of at least one hour is made between individual movement processes of the first optical element and of the second optical element. That is, the first time duration in this variant amounts to at least one hour, particularly at least 10 hours, particularly at least 100 hours, particularly at least 200 hours, particularly at least 300 hours, particularly at least 500 hours and very particularly at least 1000 hours. Here, only such times are included in the first time duration during which the first laser beam strikes the first optical element. That is, the first time duration corresponds to an operation time duration of the laser arrangement.

The presently claimed method in this variant therefore provides no fast movement of the first optical element and of the second optical element in the millisecond range as it is known from prior art. Rather, a movement of the first optical element and of the second optical element shall only take place when the positions of the first optical element and of the second optical element that are struck by the first laser beam or the second laser beam, respectively, have reached their desired or actual life span.

Consequently, movements of the optical element and of the second optical element are comparatively rare occurrences during the overall life span of the laser arrangement. When the first optical element and the second optical element, for instance, each have 10 positions that can be irradiated with laser light independently of one another, the first optical element and the second optical element must merely be moved nine times after the first adjustment during the overall life span of the laser arrangement in order to attain a life span of the laser arrangement that is ten times longer than is the case in laser arrangements from prior art.

In a variant the first optical element and the second optical element are moved in a time frame, in which the laser arrangement is not employed for its intended use. If the laser arrangement is a measurement or analysis arrangement, for instance, a movement of the first optical element and of the second optical element consequently takes place particularly in a break between two measurements or analyses, respectively. In this manner, it can be ensured in an especially simple manner that the use of the laser arrangement is not affected by moving the first optical element and the second optical element.

In other words, the optical elements are not moved during normal operation in order to avoid impacts of the movement of the optical elements on the intensity noise of the laser due to mechanical vibrations. The continuous decrease of the conversion efficiency and, consequently, of the power of the generated laser radiation that is provoked by the degradation of the optics, is preferably compensated for by an electronic control loop. With respect to its maximum output capacity, the laser system can be dimensioned such that a power reserve for the control loop can be provided. Only when the power reserve of the control loop has fallen below a suitably chosen minimum, the electronics reports the need for a movement. Preferably, this minimum is calculated such that the remaining time is sufficient to finish the current process. Only then the optical elements affected by the degradation, namely the first optical element and the second optical element, are shifted to a new position, so that when using unspent material the power reserve of the control rises again to its original value. Ideally, the life span of a usable position (of a spot) of the first optical element and of the second optical element, the so-called spot life span, is planned such that it is considerably longer than the duration of the processes that may not be interrupted.

The spot life span depends on the material used, the material that the optics is made of, and on the power density of the second laser beam. Depending on the wavelength and power of the laser radiation, the spot life spans can be between one and some 1000 hours. The overall life span of the laser system attainable in this manner corresponds to the spot life span multiplied by the number of spots. Enhancing the life span by a factor of 10 can thus easily be realized, if only the optics can be produced so large that 10 or more spots can be placed on the first optical element and the second optical element.

Variants of the specified laser arrangement are applicable in an equivalent manner to the specified method, and vice versa. All the variants can be combined with each other in any kind of way.

BRIEF DESCRIPTION OF THE DRAWINGS

Further details of the present invention shall be further explained with the help of exemplary embodiments and corresponding figures.

DETAILED DESCRIPTION

Figure 1:
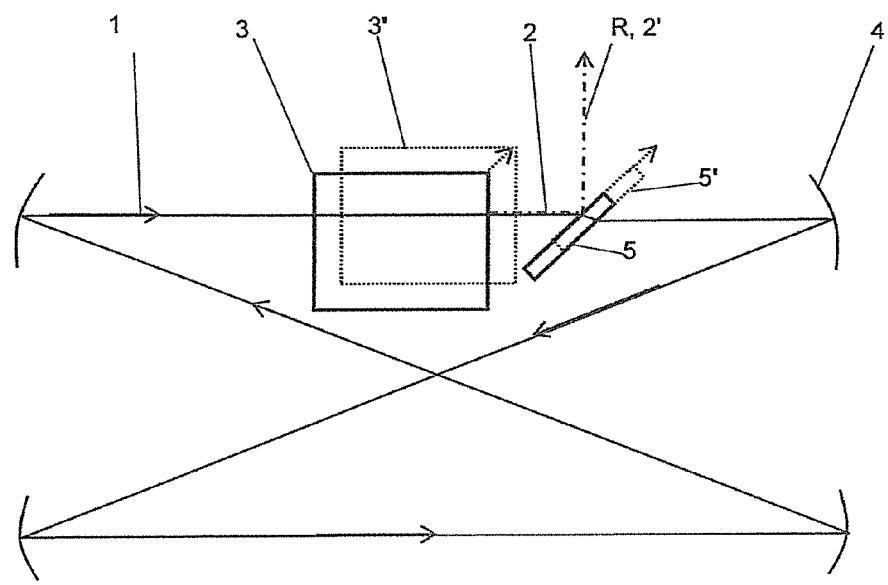
FIG. 1 shows a schematic view of a first exemplary embodiment of a laser arrangement.
Figure 2:
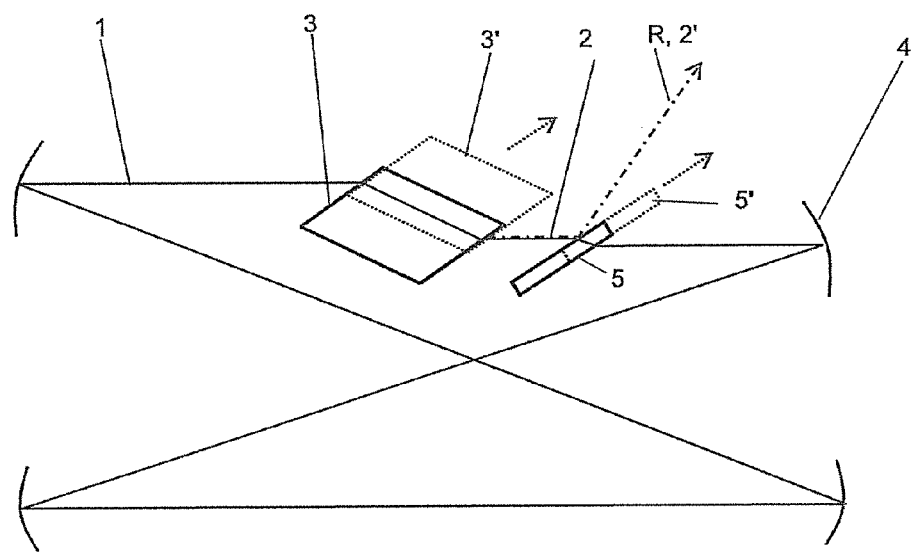
FIG. 2 shows a schematic view of a second exemplary embodiment of a laser arrangement.
Figure 3:
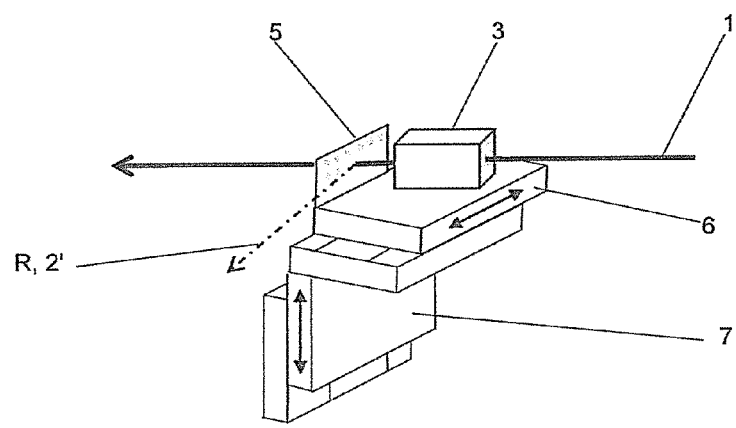
FIG. 3 shows a schematic view of a third exemplary embodiment of a laser arrangement.
Figure 4:
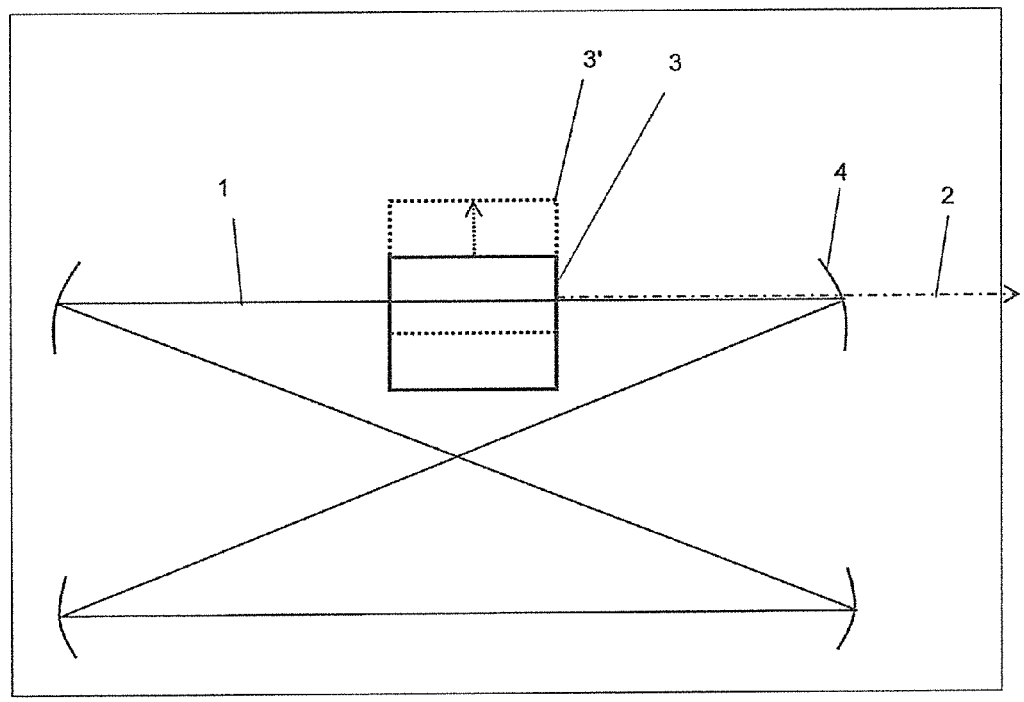
FIG. 4 shows a schematic view of a laser arrangement known from prior art.

FIGS. 1 to 3 will be explained subsequently. FIG. 4 was already explained above in the context of the discussion of the known prior art.

FIG. 1 shows a first exemplary embodiment of a laser arrangement arranged in a passive resonator as optical system.

In this laser arrangement a first laser beam 1 strikes a non-linear crystal 3, which serves as first optical element. The non-linear crystal 3 converts the first laser beam into a second laser beam 2, which has a wavelength that is smaller than that of the first laser beam 1 and lies in the range of deep UV light.

To ensure that this second laser beam 2 strikes none of the four resonator mirrors 4 of the passive resonator, a dichroic minor 5 is arranged as second optical element between the non-linear crystal 3 and the first resonator mirror 4. This dichroic mirror reflects the laser beam 2 exiting the non-linear crystal 3 out of the resonator in a direction of reflection R. The resonator mirror 4, which serves as output coupling mirror in prior art according to FIG. 4, is thereby protected from the UV radiation of the second laser beam and thus no longer represents any limitation on the life span of the laser arrangement.

The dichroic minor 5 is configured such that the circulating, unconverted first laser radiation 1 is largely transmitted, whereas the converted second laser radiation 2 is largely reflected. The non-linear crystal 3 and the dichroic mirror 5 are mounted on a joint movable support, which can carry out movements in the plane of the reflecting surface of the dichroic minor 5. Insofar as the non-linear crystal 3 and the dichroic mirror 5 are configured as plane-parallel plates, the movement of the two optical elements does not result in any movement of the laser radiation at all, neither of the converted second laser radiation 2 nor of the unconverted first laser radiation 1. Thereby, changes of the beam position and beam direction of the coupled out second laser beam 2' when moving the optical elements 3, 5 are prevented.

The life span of the arrangement is determined by those optical elements that are exposed to the UV radiation with the highest power density. In the present case, these are the non-linear crystal 3 and the dichroic mirror 5. All the other optical elements that are exposed to the UV radiation can be mounted at such a great distance that they are no longer life span-limiting for the entire laser arrangement or the entire optical system, respectively.

In the embodiment according to FIG. 1 the dichroic mirror 5, configured as plane-parallel plate, is arranged at an angle of 45° to the first laser beam 1 and to the second laser beam 2. The joint movement of the two optical elements takes place in the direction of the reflecting coated surface of the dichroic mirror 5. This is indicated in FIG. 1 by corresponding arrows. After a corresponding movement, the non-linear crystal is in the new position 3' and the dichroic mirror is in the new position 5'.

As the cubically-cut non-linear crystal 3 also acts like a plane-parallel plate, it leaves beam position and beam direction of both the circulating unconverted first laser beam 1 and also of the second laser beam 2 unchanged during this movement to the new position 3'. Additionally, the dichroic mirror 5 also leaves the reflected second laser beam 2' unchanged during the movement to the new position 5'.

When moving, the non-linear crystal 3 carries out both a lateral movement (relative to the direction of light propagation of the second laser beam 2) and also a longitudinal movement (along the direction of light propagation of the second laser beam 2). The longitudinal movement causes a minor change of the crystal position in relation to the position of the beam waist of the circulating first laser beam 1. This can cause a minor change of the beam properties of the coupled out second laser beam 2' due to the movement.

FIG. 2 shows a second embodiment in which this effect is largely avoided. The same reference signs are assigned to the same elements. The circulating, unconverted first laser beam 1 here is polarized linear in the drawing plane. The dichroic mirror 5 is arranged at the Brewster angle to the laser beam. In contrast to the embodiment of FIG. 1 only the entry plane of the dichroic mirror 5 must be furnished with a dichroic reflecting coating, whereas the exit plane orientating itself towards the resonator mirror 4 is uncoated. Due to the arrangement at the Brewster angle, on the exit side no Fresnel reflection occurs, which might cause losses on the circulating first laser radiation 1. When choosing this angle, the dichroic coating on the entry side can be produced with an especially high contrast ratio, i.e. with a very high reflectivity for the converted wavelength and an especially high transmittance for the unconverted wavelength, which is advantageous for a high conversion efficiency.

In the exemplary embodiment of FIG. 2, moreover, the non-linear crystal 3 is configured in the Brewster cut, that is to say, it has the form of a parallelepiped having an incident angle which corresponds to the Brewster angle of the crystal material. Coatings for reducing the Fresnel reflection on the entry side and the exit side are not necessary here. During a joint movement of the non-linear crystal 3 and the dichroic mirror 5 in the plane of the entry plane of the dichroic mirror 5, a longitudinal movement of the crystal in relation to the circulating first laser beam 1 only occurs when the Brewster angles of the non-linear crystal 3 and of the dichroic mirror 5 are different from each other due to different refraction indices of the materials used. When the Brewster angles are different, the longitudinal movement of the non-linear crystal 3 is merely calculated from the difference of the Brewster angles, that is, it is considerably reduced compared to the first embodiment illustrated in FIG. 1. The embodiment according to FIG. 2 therefore has a higher conversion efficiency and a smaller change of the beam parameters when moving the non-linear crystal 3 and the dichroic mirror 5 compared to the embodiment according to FIG. 1.

In order to enhance the life span of the laser system even further, the joint movement of the non-linear crystal 3 and of the dichroic mirror 5 can be carried out with an arrangement according to FIG. 3. The same reference signs are assigned to the same elements as in FIGS. 1 and 2.

By combining two linear translation stages 6 and 7 as movement appliances, movements in two spatial directions in the plane of the entry plane of the dichroic mirror 5 can be realized. Here, the first linear translation stage 6 carries out a horizontal movement (in the x-y plane) and the second linear translation stage 7 carries out a vertical movement (in the y-z plane). Thereby, the spots on the non-linear crystal 3 and on the dichroic mirror 5 can be distributed in two dimensions on the entry or exit planes, respectively, and in this way a very large number of overlap-free spots can be attained. For instance, with a spot life span of 1000 hours and a spot number of 60, an overall life span of the laser arrangement of 60 000 hours can in this way be achieved.

The invention is not restricted to the embodiments mentioned. Thus, the frequency converter can, for instance, also be located in an active resonator instead of in a passive resonator and thus serve as "intracavity" frequency converter.

The invention claimed is:

1. A laser arrangement having
   a first optical element, provided and established to convert a first laser beam having a first frequency into a second laser beam having a second frequency, wherein the second frequency is higher than the first frequency,
   a second optical element , which is transmitting for the first laser beam and reflecting for the second laser beam and which is provided and established to reflect the second laser beam in a direction of reflection,
   wherein both the first optical element and also the second optical element are movably mounted in such a way that they can be moved relative to a direction of light propagation of the second laser beam.

2. The laser arrangement according to claim 1, wherein it has at least one movement appliance which allows for a movement of the first optical element and/or of the second optical element.

3. The laser arrangement according to claim 1, wherein the first optical element and the second optical element are arranged on a joint movement appliance which allows for a joint movement of the first optical element and of the second optical element.

4. The laser arrangement according to claim 1, wherein the first optical element and the second optical element can be moved by means of a linear movement.

5. The laser arrangement according to claim 1, wherein the first optical element and the second optical element can be moved by means of a movement which takes place in two spatial directions that are perpendicular to each other.

6. The laser arrangement according to claim 1, wherein the second optical element can be moved along an entry plane for the first laser beam and/or the second laser beam.

7. The laser arrangement according to claim 1, wherein the first optical element is arranged in such a way that the first laser beam strikes the first optical element at an incident angle which corresponds to the Brewster angle.

8. The laser arrangement according to claim 1, wherein the second optical element is arranged in such a way that the first laser beam and/or the second laser beam strike the second optical element at an incident angle which corresponds to the Brewster angle.

9. The laser arrangement according to claim 1, wherein the first optical element and the second optical element are arranged within an optical system which has at least one immovable third optical element.

10. The laser arrangement according to claim 9, wherein the optical system is a laser resonator and in that the third optical element is a resonator minor.

11. The laser arrangement according to claim 10, wherein the second optical element is arranged such that it reflects the second laser beam out of the laser resonator in such a way that the second laser beam does not strike any resonator mirror.

12. A method for enhancing the life span of optical elements in a laser arrangement, comprising the following steps:

channeling a first laser beam having a first frequency onto a first optical element, converting the first laser beam by means of the first optical element into a second laser beam having a second frequency, wherein the second frequency is higher than the first frequency, channeling the second laser beam onto a second optical element, which is transmitting for the first laser beam and reflecting for the second laser beam, reflecting the second laser beam by means of the second optical element along a direction of reflection, moving the first optical element and the second optical element relative to a direction of light propagation of the second laser beam after a first time duration.

13. The method according to claim 12, wherein moving the first optical element and the second optical element takes place discontinuously.

14. The method according to claim 12, wherein the first time duration is at least one hour.

15. The method according to any of claim 12, wherein moving the first optical element and the second optical Elements takes place in a time frame in which the laser arrangement is not employed for its intended use.

* * * * *